Aug. 4, 1970     N. A. B. FLUUR ETAL     3,522,853
METHOD FOR ADJUSTING THE EFFECT OF A PRESET BATCH WEIGHT
VALVE DURING THE REPEATED WEIGHING OF MATERIAL
IN A CONTAINER
Filed Jan. 21, 1969     3 Sheets-Sheet 1

FIG.1

INVENTORS:
NILS ALF BIRGER FLUUR
ARNE OLOF SODERHOLM
BY:
Holman, Glascock, Downing & Seebold
ATTORNEYS

FIG.3

United States Patent Office 3,522,853
Patented Aug. 4, 1970

3,522,853
METHOD FOR ADJUSTING THE EFFECT OF A PRESET BATCH WEIGHT VALUE DURING THE REPEATED WEIGHING OF MATERIAL IN A CONTAINER
Nils Alf Birger Fluur and Arne Olof Soderholm, Bromma, Sweden, assignors to AB Max Sievert, Vallingby, Sweden
Continuation-in-part of application Ser. No. 536,407, Mar. 22, 1966. This application Jan. 21, 1969, Ser. No. 792,711
Claims priority, application Sweden, Mar. 25, 1965, 3,876/65
Int. Cl. G01g 23/14
U.S. Cl. 177—1          10 Claims

ABSTRACT OF THE DISCLOSURE

Batch weighing employing balance means in which taring devices for adjusting the weighing in relation to a preset selected weight value of the batches is made in such a way that the effect of the chosen weight (P.V.) of the batches is adjusted for the weighing of the following batch. By displacing one of the counter-balances of the taring devices, the balance means is brought to equilibrium in its balance position with a selected preset weight and the filled balance container and the other counter-balance is arranged to bring the balance means to its position of equilibrium following the removal of the preset weight and the balance container emptied or at least partially emptied while at least at the end of the weighing the effect of the first mentioned counter-balance has been removed.

---

This application is a continuation-in-part of our abandoned application Ser. No. 536,407 filed Mar. 22, 1966.

BACKGROUND OF INVENTION

This invention relates to a method for reducing the errors during weighing of a continuous flow of material. Weighing is desirable both in repeated transportation of material and in continuous flow of material.

There are balances of mechanical and electrical design for operating with batches as well as the so-called conveyor belt weighing equipment for the weighing of bulk material during transportation.

It is known that it is not possible with mechanical or electrical conveyor belt weighing equipment to weigh with the same high degree of accuracy as is the case when the weighing is effected in batches. In order to enable weighing in batches to be effected in continuous flows of material and thus achieve more accurate weighing it is justified at least temporarily to interrupt such flows of material. Weighing in batches is of a more direct interest when the material flow must for various reasons be handled or transported in batches. Cement, lime and similar powdery materials are, for instance, conveyed or transported in pipes equipped with intermittently operating pneumatic pumps.

Two essential error possibilities must be taken into consideration during batch weighing of material. These possibilities are present under the conditions which exist during emptying and filling respectively. During emptying of the balance container, a large or small portion of the batch may remain in the container as several materials have a tendency to adhere to the wall or to bridge and thus cause errors due to incomplete emptying. During filling to a preset weight value, the above and other irregularities in the flow qualities of the material together with the design of the filling means may cause the real weight in the balance container to be below or exceed the preset desired value. The particle size of the material with respect to the size of the batch per se also limits or restricts relative accuracy during the weighing of each particular batch.

It is known that it is possible, by means of a so-called tare device, designed to function automatically after each emptying, to eliminate the first mentioned error namely, incomplete emptying of a balance container.

SUMMARY OF INVENTION

The object of this invention is to eliminate the effect of the two above mentioned error possibilities during repeated batch weighing. The effect of such error possibilities cannot be eliminated in a separate batch weighing but for a plurality of consecutive batch weighings, the total absolute error is maintained within a limit which may occur in a separate batch weighing. In this way, the total relative error in a bulk operation including a plurality of consecutive batch weighings will be extraordinarily small. It should be mentioned that after ten batches weighed according to the present invention, the maximum relative error has been thus reduced to $\frac{1}{10}$ of the error which is otherwise probable. Generally, the present invention comprises the steps of providing a balance means for the container with at least two tare devices, adjusting the preset batch weight value to be used for the following batch by displacing one of the tare devices for taring the balance means to a balance position following interruption of the filling of the container by the balance means being near the balance position, displacing the other tare device for taring the balance means to a balance position while the preset batch weight value is inactive following at least partial emptying of the contents of the container and removing at the end of weighing the effect of the first-mentioned tare device. Thus, at least at the end of the weighing, the effect of the first-mentioned tare device is suspended or the tare device is returned to one end the same arbitrary reference position.

Further objects and advantages of the invention will become more readily apparent to persons skilled in the art from the following detailed description and annexed drawings, and in which drawings:

BRIEF DESCRIPTION OF FIGURES

FIG. 1 is a diagrammatic view of a mechanical balance beam adapted for use with the present invention, FIG. 3 is a diagrammatic view illustrating in greater detail a variant of the embodiment illustrated in FIG. 2 and showing an electrical circuit with a strain-gauge type load cell.

DETAIL DESCRIPTION OF INVENTION

Figure 2:
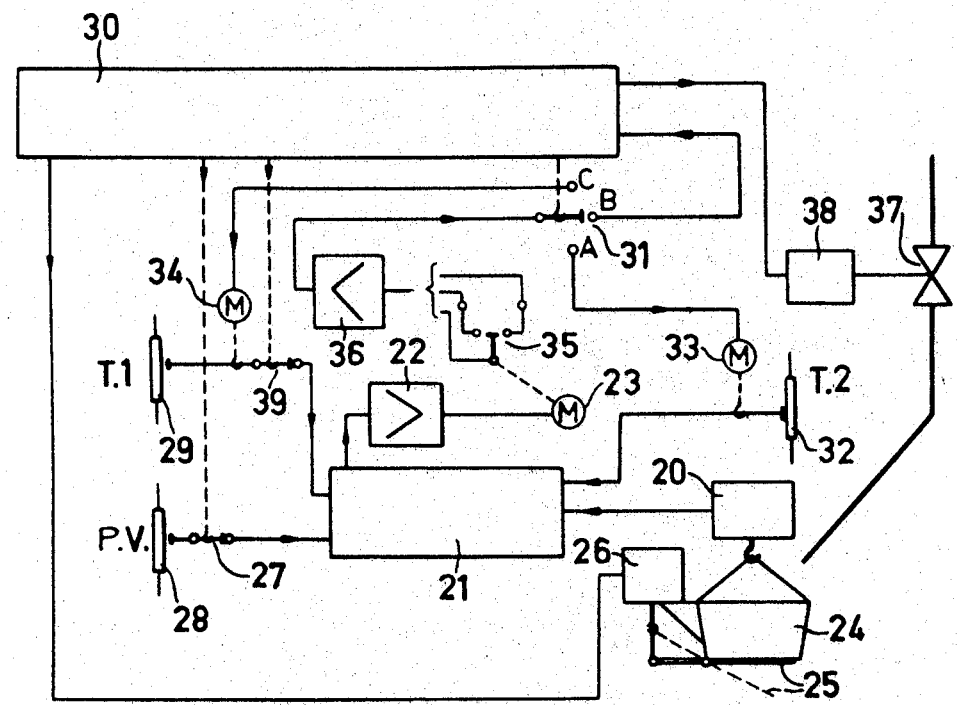
FIG. 2 is a diagrammatic view of an electric balance (dynamometer)

Referring to FIG. 1, it will be seen that a balance 1 is mounted at its midpoint and includes two arms 1a and 1b and a balance container 2 provided with a flap 3 is carried by the arm 1b. The flap 3 is operated by an adjusting means 4. The arm 1a can be relieved of a counterweight or loaded with the counterweight by a hoisting gear 5 of suitable type and the counterweight is equal to the desired weight of each batch value (P.V.) A taring device of counterbalance T1 is operably related to the arm 1a and is adjusted by the displacement of a tare weight 7 slidably mounted on a shaft 8. The displacement of the tare weight 7 is effected by a motor 14 and the threaded shaft of the motor indicated by the dash line in FIG. 1 extends through an internally threaded hole in the weight 7. The motor is a two-phase motor with one winding thereof namely, a reference winding, always being fed with an alternating voltage and the second winding thereof, namely the control winding being fed as follows for producing different directions of movement of the motor. More specifically, when the motor is inoperative, the control winding is not fed and for rotation in one direction, the control winding is fed with a voltage having a 90° lead phase over the voltage of the reference winding while for rotation in the opposite direction, the control winding is fed with a voltage having a 90° phase lag with reference to the voltage of the reference winding.

The tare weight 7 has a so-called reference position and which position is indicated by dotted line in FIG. 1. More specifically, the tare device T1 is brought to tare the balance to a balance position with the batch pre-selected value (P.V.) active after the filling of the balance container has been interrupted and the other tare device T2 is adapted to tare the balance to the balance position with the pre-setting in the inactive condition or disconnected after the balance container has been emptied at least in part. During the end of the weighing, the effect of tare device T1 is removed or the tare device is brought back to one and the same arbitrary reference position. As an auxiliary means for returning the tare weight to its reference position, two contacts 19a and 19b are required. The contact 19a is closed when the tare weight 7 is to the left of the reference position and assuming that a switch 19 has a closed position, the control winding of the motor 14 receives a voltage of such a phase that the motor drives the weight 7 toward the right, namely to the reference position. When the weight 7 is to the right of the reference position, the contact 19b is closed and the control winding of the motor 14 receives a voltage of such a phase that the weight 7 is driven to the left to the reference position by the motor. When the weight 7 reaches the reference position from either direction, the contacts are opened and the control winding of the motor is de-energized even if the switch 19 is still closed.

The arm 1b which supports the container 2 is equipped with a second tare device T2 including a tare weight 11 and which weight is slidable on a shaft 12 and is driven by a motor 13 to different positions along the shaft 12. It will be noted that the motor 13 is provided with a threaded shaft which extends through a correspondingly threaded hole in the weight 11. The motor 13 can rotate in either direction or be deactivated via a reference winding and a control winding. The direction of movement of the motor 13 is related to the feed of the windings as herein above described in connection with the motor 14.

A program unit 9 includes basically a shaft driven by a synchronous motor and provided with discs having high points and low points for actuating electrical and/or pneumatic switches for effecting the different orders indicated in FIG. 1. One of the switches actuates an adjustment means 18 in order to assume a position in which a flap 17 is open to permit the material to enter the container 2. This effect can be negatived by a switch operably connected in series and actuated by a balance indicator 15 via an amplifier 16 when switch 10 is held in a position B by the program. The switch 10 has two other positions to which it can be moved by the program unit and in one position A, taring or counter-balancing is achieved by the tare device T2 and in the other position C, taring or counter-balancing is accomplished by the tare device T1. The balance indicator 15 includes a contact arrangement for imparting to the amplifier 16 the output voltage 0 if balance has been achieved but if such an unbalance is present which would require the tare weights 7 and 11 to be moved to the right to reach balance, a voltage of such a phase is applied by the indicator 15 to the output of the amplifier 16 that the motors 13 and 14 respectively move the weight 11 and 7 gradually to the right. If an unbalance is such that the weights 7 and 11 respectively are moved to the left in order to restore balance, the indicator 15 will impart a suitable voltage so as to create a voltage of such a phase on the output of the amplifier 16 that the motors 13 and 14 drive the weights 11 and 7 respectively to the left.

When employing the method disclosed in FIG. 1, it will be assumed that the container 2 is empty except for a certain amount of material which remains from a previous weighing operation and the flap 3 is closed by the adjusting means 4. The hoisting gear 5 has unloaded the weight 6 from the arm 1a and the weight 7 is remote from its reference position by a distance which corresponds to the surplus material supplied to the container 2 during the filling step.

The program unit 9 is activated and sets the switch 10 in the position A. The motor 13 is energized and displaces the weight 11 until balance is obtained and the rotation of the motor 13 is arrested by the indicator 15 when balance is accomplished.

The program unit 9 will set the switch 10 in the position B and the switch 19 will supply voltage to the motor 14. The rotation of the motor 14 will displace the weight 7 towards its reference position thereby causing a certain unbalance and the rotation of the motor 14 is stopped when the contact 19a or contact 19b is open, that is to say, when the weight 7 is in the reference position.

The program unit 9 will cause a lowering of the weight 6 by the hoisting means until it bears on the balance arm 1.

The program unit 9 opens the flap 17 by way of the adjusting means 18 and the material flows into the container 2. When the balance position has been attained, the indicator 15 closes the flap 17 via the adjustment means 18 and thus interrupts the flow of the material. A certain amount of the material which is located in the conduit or piping between the flap 17 and the container 2 will continue to flow into the container thereby bringing about a certain unbalance.

The program unit 9 will set the switch 10 to the position C, and the unbalance indicator 15 due to unbalance will cause the motor 14 by the switch 10 to displace the weight 7 until equilibrium is again realized.

The unit 9 will change the switch 10 to the position B and the unit will cause the flap 3 to be opened by the adjustment means 4 operably related thereto. The material flows from the container 2 and the program unit 9, by means of the hoisting gear 5, will cause the weight 6 to be unloaded from the balance means 1. The unit 9 closes, by the adjustment means 4, the flap 3 of the container 2.

The cycle is then completed and a new cycle may be initiated.

The equipment is thereby returned to its initial position and it should be observed that the weight 7 is then not in its reference position in view of the fact that it has been displaced to compensate for the surplus material at the last filling of the container 2. The filling error is thus stored in the taring unit T1. Following the emptying of the weighing container, the taring unit T2 is placed in operation and this taring system takes over the information with respect to the filling error from the unit T1 and further stores superimposed the information on the amount of material which remains in the container after emptying. Consequently, during the next filling, T2 will function alone and impart the necessary and proper correction of the nominal pre-set batch weight.

Referring now to FIG. 2 in which there is disclosed an electric balance (dynamometer), it will be noted that a load sensing means 20 of resistive type (strain gauge) or magnetostrictive type is connected to an electrical circuit 21 for possible necessary correction and/or linearizing of the output signal of the load sensing means. The electrical circuit is designed to indicae when the pre-selected weight of material (P.V.) has been fed into the container. If the load sensing means is of a resistive type provided with stain gauges, the pre-selected weight value and the two tarings or counter-balancings may each be adapted so that their effects are superimposed on the load sensing means as unbalances in a Wheatstone bridge which includes the strain gauges. The output signal from the circuit 21 is amplified in an amplifier 22 to a level which is sufficient for operating an electro-dynamic motor 23. The electrodynamic motor 23 actuates a switch 35 which has three positions and in this fashion gives the output of the amplifier 36 one of three different values. When the switch 35 is in a neutral position (equilibrium position of the balance), the voltage of the output of the amplifier 36 is zero and when the switch 35 has an unbalance position to the right which corresponds to an increasing load on the load sensing means, the following occurs. A voltage is received at the output of an amplifier 36 of such a phase that the voltage across a two phase motor 33 causes the motor to drive a potentiometer 32 in a direction tending to change the output signal of the circuit 21 to register a reduction in the load experienced by the sensing means 20, and this apparent reduction in the load is registered on the device T2 by the potentiometer 32 which constitutes a part thereof.

When the switch 35 is in the opposite unbalance position which corresponds to a decreasing load of the load sensing means, the amplifier 36 receives an output voltage of opposite phase. In other words, a phase such that the voltage connected to the control winding of the motor 33 drives the motor in such a direction that the potentiometer 32 is operated so as to change the output signal of the electric circuit 21 in a direction corresponding to an increase in the load of the load sensing means 20. The taring device T1 also consists of a two phase motor 34 which is mechanically coupled in order to adjust the potentiometer 29 thereby changing the output signal of the circuit 21 as above described for the tare device T2. The two motors 33 and 34 each have two windings with one of the windings, namely the reference winding always being fed with an alternating current, while the other winding, the control winding, imparts to the motor a rotation in one or the other direction in a manner similar to the operation of the motors 13 and 14 shown in FIG. 1. The actual direction involved depends upon the fact that the control winding is fed with alternating current leading or lagging by ninety degrees with respect to the alternating current of the reference winding. The supply voltages of the reference windings in the motors 33 and 34 are of the same phase, but 90° out of phase with respect to the voltages developing at the output of the amplifier 36. The voltage supplies of the reference windings are connected with the appropriate polarity in order that when the taring device T1 and the taring device T2 respectively are activated by the program unit 30 for moving a switch 31 to position C or A respectively, unbalance is removed by the direction of rotation of the motors 34 and 33 respectively. The effect of the taring device T1 can be removed by a switch 39 which is operated by the program unit 30. It should be mentioned that the program unit 30 is of the same type as the unit 9 disclosed in FIG. 1 and actuates input impulse means for effecting the different functions obvious from the figure and described below. The program unit may further include suitable amplifiers necessary for operating actuating means 26 and 38. The actuating means 26 opens and closes a flap 25 for emptying a balance container 24. Material enters the container 24 by way of a baffle 37 which is opened and closed by the actuating means 38. Some of the output amplifiers of the unit 30 are assumed to have a latching function whereby the program unit 30 locks the output amplifier of the actuating means 38 in an open position and the output amplifier returns to a position which tends to cause closing. This develops when the switch 35 in its balance position disconnects the amplifier 36 and thereby removes the voltage output supplied to the unit 30 by way of the changeover switch 31 in the position B.

The sensing means 20, circuit 21, amplifier 22 and motor 23 perform the same function as the balance 1 in FIG. 1. The balance container 24, baffle 25, and the adjusting means 26 are identical with the corresponding means 2, 3 and 4 respectively of FIG. 1. The switch 27 disconnects the effects so to speak of the pre-selected value (P.V.) thereby simulating the action of the hoisting gear 5 unloading the weight 6 in FIG. 1. The pre-selected setting 28 is in effect counter-balancing the material supplied to the balance container 24 in the same manner as the weight 6 counter-balances the material in the container 2. The tare device T1 and T2 in FIG. 2 are electrical, but in restoring balance these components correspond to the mechanical tare devices T1 and T2 of FIG. 1. In the electrical tare device, the effect whereby it is disconnected by the switch 39 corresponds to the action of the weight 7 in FIG. 1 reaching its reference position. The program unit 30 is identical in both structure and function to the program unit 9. Furthermore, the switch 31, actuating means 38 and baffle 37 are identical in function to the corresponding components 10, 18 and 17 in FIG. 1.

Figure 3:
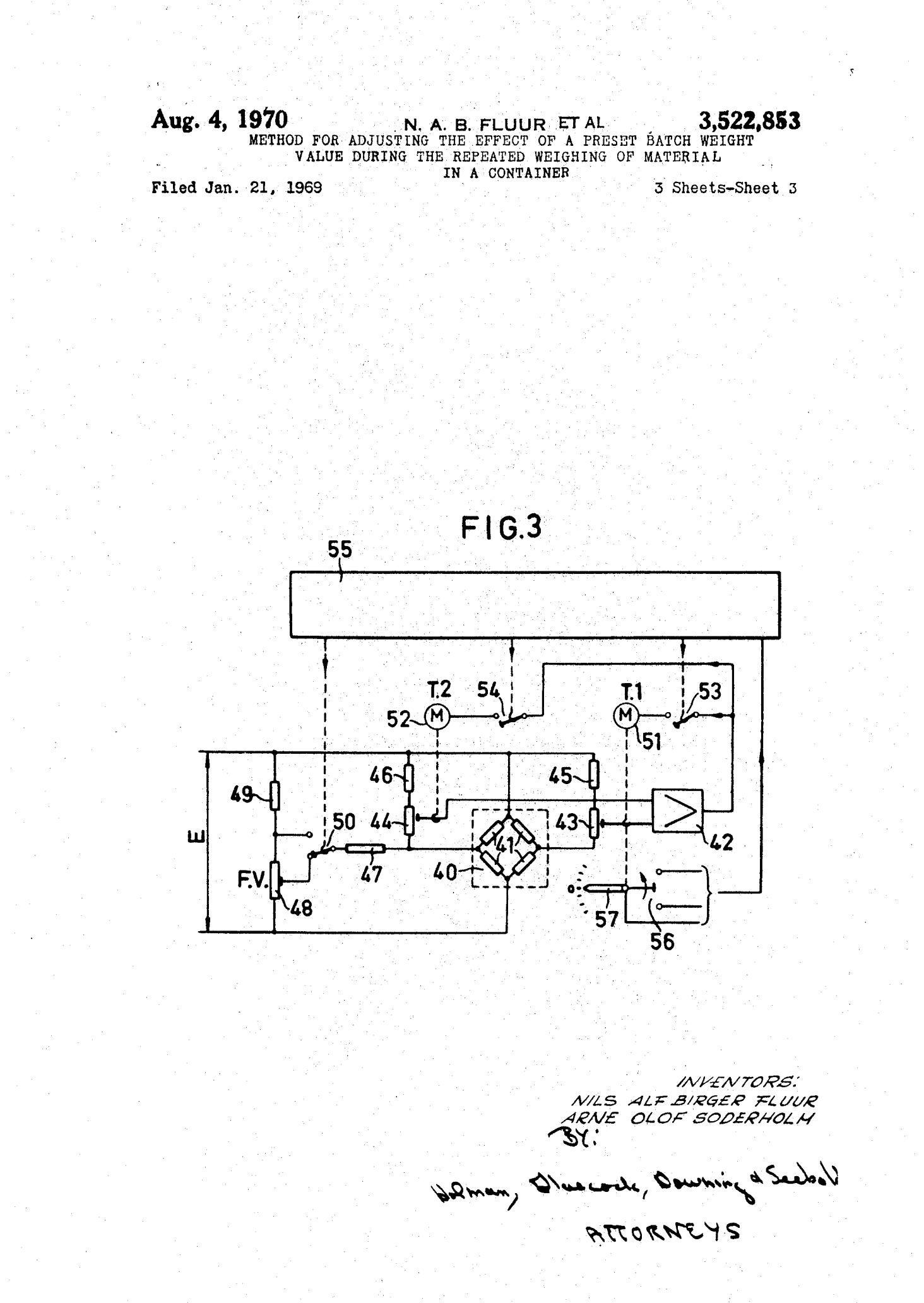

In FIG. 3 there is illustrated an electrical circuit provided with a strain gauge type load cell and indicates the manner in which the devices of an electrical balance can be combined to make feasible a variant of the present method. In this particular embodiment, the balance container (not illustrated) is carried by a dynamometer 40. The dynamometer includes four strain gauges 41 which are connected in a Wheatstone bridge and the bridge is fed via one of the diagonals by an excitation voltage E and unbalance across the other diagonal is sensed by amplifier 42. The unbalance is sensed or detected by the amplifier through sliding contacts of the potentiometers 43 and 44 which are included in tare circuits T1 and T2 respectively. The positions of the sliding contacts determine the tare or counter-balance effect in the relative tare device and such effect is sensed by the amplifier 42 as a voltage. The voltage of the unbalance and two tare voltage are superimposed on each other by a series connection. In order to hold the tare voltages in a suitable order of magnitude, namely, a magnitude equal to the unbalance signal, each of the potentiometers 43 and 44 is connected in series with a greater resistance 45 and 46 respectively. The pre-selected setting (P.V.) includes a resistance 47 connected at one end to a corner of the Wheatstone bridge and with the other end to either the sliding contact of a potentiometer 48 or to a connection between the potentiometer 48 and the resistance 49. The resistance 47 acts on the balance of the Wheatstone bridge and the result of the balance is dependent upon the position of the sliding contact and the proportion between the resistances 48 and 49 respectively due to the position of the changeover switch 50. By a displacement of the sliding contact of the potentiometer 48, the size of the pre-selected value can be altered and by the changeover switch 50, the pre-selected setting can either by rendered active or inactive and replaced by the constant unbalance ascertained by the proportion between the resistances 48 and 49 and which is suitably adapted for compensating for the net tare weight of the container. The amplifier 42 senses the unbalance of the dynamometer not only superimposed by the effect of the taring devices T1 and T2 but also superimposed on the effect of the pre-selected value. The quantity of material in the container affects directly the balance of the Wheatstone bridge as well as the pre-selected value (P.V.). The effect of the tare devices T1 and T2 is however, developed in an electrical circuit outside of the dynamometer, that is, corresponding to the electrical circuit 21 illustrated in FIG. 2. If the resulting input voltage to the amplifier 42 deviates from zero, the output voltage of the amplifier actuates, via switches 53 and 54 respectively, motors 51 and 52 respectively for driving potentiometers 43 and 44 in such a direction that the resulting input voltage becomes zero, with the output voltage of the amplifier disappearing. The function of the means 16, 14 and 13 in FIG. 1 and the means 36, 34 and 33 in FIG. 2 correspond to the function of the amplifier 42 and the motors 51 and 52 respectively. The means in FIG. 3 thus defined in detail are covered by the schematically illustrated components in FIG. 2. The means modified in comparison to FIG. 2 are the changeover switch 31 and tare device T1. Moreover, program unit 55 is also modified with respect to the output orders relating to the modification of the inventive concept. The closing of the switch 53 thus corresponds in FIG. 2 to the moving of the switch 31 to the position C. Similarly, the closing of the switch 54 corresponds to the actuation of the changeover switch 31 to the position A. The position B of the changeover switch 31 (FIG. 2) makes it possible for the balance indicator 35 to interrupt the filling but with the equipment (FIG. 3), the changeover switch 53 is maintained in a closed position, that is to say, the taring device T1 is maintained continuously activated during the filling process. This would, with the assemblage illustrated in FIG. 1, correspond to the fact that the changeover switch 10 is maintained in the position C by the program unit during the filling process described. With the means illustrated in FIG. 1, this would have the result that gradually during filling the tare device T1 maintains the balance by displacing the weight 7. In FIG. 3, the tare device T1 is operative during filling until a switch mechanically connected to a sliding contact of the potentiometer 42 interrupts the filling. With the FIG. 1 embodiment, this would correspond to the ability of the weight 7 to interrupt the filling when the weight reaches its reference position. With the assemblage illustrated in FIG. 3 or that in FIG. 1 modified as above described in connection with the FIG. 3 embodiment, the present method may be performed. This method differs from that previously described because the tare device T1 by being placed into operation at a certain time before the filling need be interrupted and also by the balance interrupting the filling when the tare weight reaches the reference position need not be returned to its reference position by a special operation before filling is interrupted by the balance. When the balance interrupts the filling, the tare device T1 must be returned to the reference position. The above embodiments are thought to clearly illustrate and describe the methods for the weighing of batches wherein the control assemblage of the balance interrupts the filling of the balance container. It is appreciated that a corresponding method can be utilized in situations where the control equipment of the balance interrupts the emptying instead. The emptying as previously described is replaced by filling to a degree which need not per se be carefully controlled but need only be approximately equal to the pre-selected setting of the batch to be emptied. The material at each filling may then be dumped or discharged from a suitable sized hopper located above, or interrupted by means of, a level primary element in the weighing hopper.

When employing the method in connection with a continuous material flow, it is possible to overcome the need to install a buffer hopper, to alternate the material supply between two separate balance systems. The balance systems may then be designed with a common modified program unit and also additional means in the balances may be common. It should further be noted that the invention is applicable to all types of balances which may be provided with connections and disconnections, batch pre-setting and tare devices notwithstanding which types of means the balance or balances contain, such as for instance pneumatic or hydraulic type.

The weighing operations as described below may be summarized in the following table, with the following significance of certain symbols:

P.V.: the preset nominal weight of each normally formed batch
$T_1^P$: the tare for the taring or equalizing operating of order P with the aid of the taring device $T_1$
$1T_2^P$: the tare for the taring or equalizing operation of order $p$ with the aid of taring device $T_2$
$q^P$: the remaining quantity of material in the container after weighing of order $p$
$Q^P$: the quantity of material supplied to the container at the weighing of order $p$.

| Number of weighing operation | Weight acting for counter-balancing the action of material in container 2 | Balance or unbalance condition | Weight of material in container 2 | Weight of material emptying at each weighing operation |
| --- | --- | --- | --- | --- |
| 0 | $T_1^0 + T_2^0$ | Balance | $q^0$ | |
| 1 | $T_2^0$ <br> $T_2^0 + P.V. + T_1^1$ <br> $T_2^0 + T_1^1$ <br> $T_1^1 + T_2^1$ | Unbalance <br> Balance <br> Unbalance <br> Balance | $q^0$ <br> $q^0 + Q^1$ <br> $q^1$ <br> $q^1$ | $(Q^1 + q^0 - q^1)^*$ <br><br><br> $P.V. + T_2^0 - T_1^2$ |
| — | — — — — | — | — | — — — — |
| n | $T_2^{n-1}$ <br> $T_2^{n-1} + P.V. + T_1^n$ <br> $T_2^{n-1} + T_1^n$ <br> $T_1^n + T_2^n$ | Unbalance <br> Balance <br> Unbalance <br> Balance | $q^{n-1}$ <br> $q^{n-1} + Q^n$ <br> $q^n$ <br> $q^n$ | $(Q^n + q^{n-1} - q^n) = P.V. + T_2^{n-1} - T_2^n$ |
| n+1 | $T_2^n$ <br> $T_2^n + P.V. + T_1^{n+1}$ <br> $T_2^n + T_1^{n+1}$ <br> $T_1^{n+1} + T_2^{n+1}$ | Unbalance <br> Balance <br> Unbalance <br> Balance | $q^n$ <br> $q^n + Q^{n+1}$ <br> $q^{n+1}$ <br> $q^{n+1}$ | $(Q^{n+1} + q^n - q^{n+1}) = P.V. + T_2^n - T_2^{n+1}$ |

Total weight of material emptied during $(n+1)$ weighing operations of successive batches is thus:

$$P: {}_1^{n+1}Q^1 + {}_0^n g^1 - {}_1^{n+1} = {}_1^{n+L}Q^1 + q^0 - q^{n+1}$$
$$= (n+1)(P.V.) + {}_0^n T_2^1 - {}_1^{n+1} T_2^1$$
$$= (n+1)(P.V.) + T_2^0 - T_2^{n+L}$$

We claim:
1. A method for adjusting the effect of a preset batch weight value during the repeated weighing cycles of material in sequential batches in a container with the preset batch weight value having active and inactive conditions and a balance means for the container provided with at least two taring devices, the improvement comprising the steps of:
  (a) charging material into the previously discharged container with the preset batch weight value in active condition,
  (b) interrupting the charging of material into the container by the balance means being near the balance position,
  (c) displacing one of the taring devices for taring the balance means to a balance position with the preset batch weight value still in active condition,
  (d) discharging the material from the container,
  (e) displacing the other taring device for taring the balance means to a balance position while the preset batch weight value is in inactive condition,
  (f) temporarily neutralizing the effect of said one taring device at least prior to step (b) and said neutralizing step not lasting longer than the completion of step (c) of the succeeding cycle, respectively, and
  (g) repeating steps (a)–(f).
2. The method as claimed in claim 1 in which said one taring device substantially continuously tares the balance means during charging of the container and the charging being interrupted by the balance means when said one taring device reaches the same reference position.

3. The method as claimed in claim 1 and further including controlling of the weighing cycle by ordering said steps.

4. The method as claimed in claim 3 and further initiating the succeeding weighing cycle following the completion of the preceding cycle.

5. The method as claimed in claim 4 and further initiating a counter mechanism during the weighing cycle.

6. A method for adjusting the effect of preset a batch weight value during the repeated weighing cycles of material in sequential batches in a container with the preset batch weight value having active and inactive conditions and a balance means for the container provided with at least two taring devices, the improvement comprising the steps of:
  (a) discharging material from the previously charged container with the preset batch weight value in active condition,
  (b) interrupting the discharging of material from the container by the balance means being near the balance position,
  (c) displacing one of the taring devices for taring the balance means to a balance position with the preset batch weight value still in active condition,
  (d) charging material into the container.
  (e) displacing the other taring device for taring the balance means to a balance position while the preset batch weight value is in inactive condition,
  (f) temporarily neutralizing the effect of said one taring device at least prior to step (b) and said neutralizing step not lasting longer than the completion of step (c) of the succeeding cycle, respectively, and
  (g) repeating steps (a)-(f).

7. The method as claimed in claim 6 in which said one taring device substantially continuously tares the balance means during discharging of the container and the discharging being interrupted by the balance means when said one taring device reaches the same reference position.

8. The method as claimed in claim 6 and further including controlling of the weighing cycle by ordering said steps.

9. The method as claimed in claim 8 and further initiating the succeeding weighing cycle following the completion of the preceding cycle.

10. The method as claimed in claim 9 and further initiating a counter mechanism during the weighing cycle.

References Cited

UNITED STATES PATENTS 2,434,177　1/1948　Richardson _____ 177—46
3,124,206　3/1964　Burke _____ 177—165

RICHARD B. WILKINSON, Primary Examiner

G. H. MILLER, Jr., Assistant Examiner

U.S. Cl. X.R.
177—165, 176, 213